United States Patent [19]

Shaheen et al.

[11] Patent Number: 4,496,215

[45] Date of Patent: Jan. 29, 1985

[54] FIBER OPTIC CABLE

[75] Inventors: Joseph M. Shaheen, La Habra; Herbert W. Yancey, Downey, both of Calif.

[73] Assignee: Rockwell International Corporation, El Segundo, Calif.

[21] Appl. No.: 421,761

[22] Filed: Sep. 23, 1982

[51] Int. Cl.³ .............................................. G02B 5/16
[52] U.S. Cl. ................................. 350/96.23; 350/96.20
[58] Field of Search ................. 350/96.20, 96.22, 96.23

[56] References Cited

U.S. PATENT DOCUMENTS

| | | | |
|---|---|---|---|
| 3,984,172 | 10/1975 | Miller | 350/96.21 |
| 4,138,193 | 2/1979 | Olszewski et al. | 350/96.23 |
| 4,176,910 | 12/1979 | Nöethe | 350/96.23 |
| 4,239,335 | 12/1980 | Stiles | 350/96.23 |
| 4,307,386 | 12/1981 | Bridge | 350/96.23 X |

*Primary Examiner*—William L. Sikes
*Assistant Examiner*—Akm E. Ullah

*Attorney, Agent, or Firm*—H. Fredrick Hamann; James F. Kirk

[57] ABSTRACT

A fiber optic cable for connecting at least one optical transmitter to at least one optical sensor in an electronic assembly, the fiber optic cable comprising: a first surface layer; a second surface layer, the first and second surface layers being in stacked parallel plane relation; a resin layer, the first surface layer and the second surface layer being bonded together by the resin layer; at least one fiber optic filament, each fiber optic filament being embedded in the resin layer in a predetermined pattern; means for terminating each respective fiber optic filament to facilitate optically coupling each respective optical transmitter to a respective optical sensor; the first surface layer, the second surface layer, the resin layer and the fiber optic filament being laminated forming a relatively flat ribbon cable having a cross section relatively free of voids; whereby the fiber optic cable is formed as a relatively thin, flexible, flat layer facilitating installation in an electronic assembly.

12 Claims, 8 Drawing Figures

FIBER OPTIC CABLE

BACKGROUND OF THE INVENTION

1. Field of the Invention

This invention relates to fiber optics, and particularly to fiber optic cables. The principal advantage of the subject invention fiber optic cable is its flat configuration and its ability to provide flat turns. The invention fiber optic cable is of particular use in optically coupling signal paths between modules and subassemblies within larger electronic assemblies.

2. Description of the Prior Art

Presently known fiber optic cables are typically comprised of bundles of fiber optic filaments contained within a cylindrical covering or casing and typically having a circular cross section. Fiber optic cables having a circular cross section are not well adapted for use in electronic packaging requiring very high component density. Cables having a circular cross section have the additional disadvantage of requiring a larger radius of curvature to complete a given turn as the number of filaments contained within the cross section is increased. Cables having a round cross section are typically difficult to bifurcate so as to service or terminate at more than two ends. In addition, as a fiber optic cable having a circular cross section is increased in diameter, packaging difficulty is experienced in routing the cable around corners within electronic assemblies, under modules and under and around multilayer interconnection circuit boards.

The inventor of record is named as a co-inventor in an application for U.S. Patent titled "Multiconductor Flat Cable and Method and Apparatus for Assembling Same" conceived under U.S. Air Force Contract F0470177-C-0107, Ser. No. 375,640 and filed on May 6, 1982. This application references U.S. Pat. Nos. 3,523,844 and 4,000,558 as being of interest also.

SUMMARY OF THE INVENTION

It is a major objective of this invention to provide a thin, flat, flexible, multi filament, rugged fiber optic cable capable of being manufactured with curved as well as straight and bifurcated segments.

Another object of this invention is to provide a means for aligning corresponding cable ends so as to register corresponding fiber optic filament ends.

These and other objectives of the invention are realized in a fiber optic cable for connecting at least one optical transmitter to at least one optical sensor in an electronic assembly, the fiber optic cable comprising: a first surface layer; a second surface layer, the first and second surface layers being stacked in parallel plane relation; a resin layer, the first surface layer and the second surface layer being bonded together by the resin layer; at least one fiber optic filament, each fiber optic filament being embedded in the resin layer in a predetermined pattern; means for terminating each respective fiber optic filament to facilitate optically coupling each respective optical transmitter to a respective optical sensor; the first surface layer, the second surface layer and the resin layer and the fiber optic filament form a relatively flat, thin, flexible, ribbon fiber optic cable having a cross section relatively free of voids, the fiber optic cable's relative flatness, thinness and flexibility facilitating installation of said first optic cable in an electronic assembly.

In a more particular embodiment of the invention, each fiber optic filament is spaced in precise predetermined parallel relation with adjacent fiber optic filaments within the flat ribbon cable and wherein said means for terminating each respective fiber optic filament further comprises at least a first and second cable end. The first and second cable ends are each formed as a flat plane exposing fiber optic filament terminations, each respective flat plane being transverse and normal to the fiber optic cable longitudinal axis. The first and second cable ends are polished to adapt each fiber optic filament termination for optical coupling.

In a yet even more particular embodiment, the first and second layers are formed of flexible polyimide sheet, the polyimide sheets being adapted to provide structural support to the immobilized fiber optic filament. In yet another alternative embodiment, the first and second layers are formed of flexible polyethylene teraphthalate sheet, the polyethylene teraphthalate sheets being adapted to provide structural support to the immobilized fiber optic filament whereby each fiber optic filament is protected from tensile and shear stress. In another alternative embodiment, at least one of the first and second layers are formed from sheet KAPTON or from sheet MYLAR.

In another particularly preferred embodiment, the fiber optic cable further comprises: at least one curved segment, each respective curved segment having an entry segment, an exit segment, and a contoured segment having a predetermined contour and being interposed between the entry segment and the exit segment. Each respective entry segment and each respective exit segment have a top surface layer, an adhesive layer interposed between the top surface layer and the first surface layer. The top surface layer is laminated to the first surface layer. Each respective entry segment also includes a bottom surface layer, a bottom adhesive layer interposed between the bottom surface layer and the second surface layer, the bottom surface layer being laminated to the second surface layer by the bottom adhesive layer.

In an even more particular embodiment, the contoured segment further comprises a top surface layer, a bottom surface layer, the top and bottom surface layers being in stacked parallel plane relation. A resin layer is included, the top surface layer and the bottom surface layer being contoured and bonded together by the resin layer. At least one fiber optic filament is included, each fiber optic filament is embedded in the resin layer in a predetermined pattern.

In a most particular preferred embodiment, the first and second cable ends further comprise: a short top rigid laminate having a transverse edge, a short top rigid laminate adhesive layer interposed between the first surface layer and the short top rigid laminate, the short top rigid laminate being bonded to the first surface layer; a short bottom rigid laminate having a transverse edge, a short bottom rigid laminate adhesive layer interposed between the second surface layer and the short bottom rigid laminate, the short bottom rigid laminate being bonded to the second surface layer, each respective short top rigid laminate transverse edge and the short bottom rigid laminate transverse edge being coplanar with the respective cable and flat plane, the fiber optic filaments having ends exposed and being co-planar with the cable end flat plane. Means for alignment are included, the means for alignment being adapted to position each respective fiber optic filament end into coaxial alignment with a corresponding fiber optic filament end.

In yet another particular preferred embodiment, the means for alignment is adapted to align opposing cable ends and further comprises: an alignment plate having a flat surface and at least two alignment pins perpendicular to the flat surface, the opposing cable ends to be aligned and mated each having at least one alignment hole adapted to receive a corresponding alignment pin, each opposing cable end respective short bottom rigid laminate surface being bonded to a respective alignment plate flat surface with the respective alignment holes receiving corresponding alignment pins and with the alignment plate flat surface holding the opposing cable ends in registration.

In another most particular preferred embodiment, the respective curved segment top surface layer and bottom surface layer are further comprised of flexible polyethylene teraphthalate sheet, the polyethylene teraphthalate sheet being adapted to provide structural support to the immobilized fiber optic filament; whereby each fiber optic filament is protected from tensile and shear stress. In an alternative embodiment, at least one of the top surface layers and bottom surface layers is formed from sheet KAPTON. In yet another alternative embodiment, at least one of the top surface layers and bottom surface layers is formed from sheet MYLAR.

BRIEF DESCRIPTION OF THE DRAWINGS

The invention will be further described as to an illustrative embodiment in conjunction with the accompanying drawings in which.

DESCRIPTION OF THE PREFERRED EMBODIMENT

Figure 1:
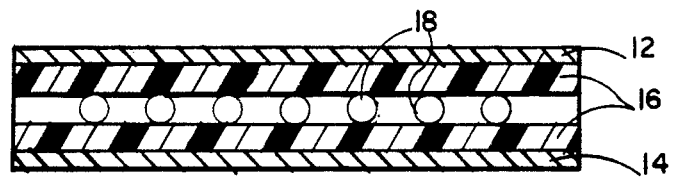
FIG. 1 is an end elevation view of the invention fiber optic cable prior to lamination.

FIG. 1 is an end elevation view of the invention fiber optic cable prior to lamination showing a first surface layer 12; a second surface layer 14. The first and second surface layers are stacked in parallel plane relation, i.e. they are disposed in parallel planes one above the other. Resin material 16 is illustrated sandwiching a plurality of fiber optic filament 18.

Figure 2:
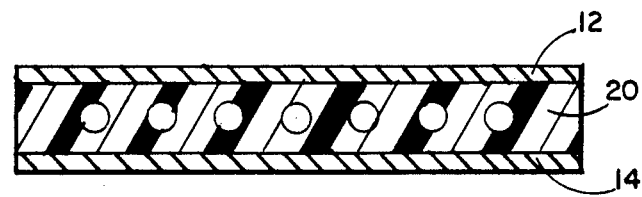
FIG. 2 is an end elevation view of the invention fiber optic cable subsequent to lamination.

FIG. 2 depicts resin layer 20 subsequent to lamination. The first surface layer 12 and the second surface layer 14 are bonded together by the resin layer 20. At least one fiber optic filament 18 and more generally many fiber optic filaments are bonded together by resin layer 20. Each fiber optic filament 18 is embedded in the resin layer 20 in a predetermined pattern.

A means for terminating each respective fiber optic filament to facilitate optically coupling each respective optical transmitter to a respective optical sensor is required (not shown in FIG. 2).

The first surface layer 12, the second surface layer 14, the resin layer 20 and the fiber optic filament 18 are laminated using heat and pressure to form a relatively flat ribbon cable having a cross section relatively free of voids. Each fiber optic filament, such as 18, is spaced in a precise predetermined parallel relation with adjacent fiber optic filaments.

Figure 3:
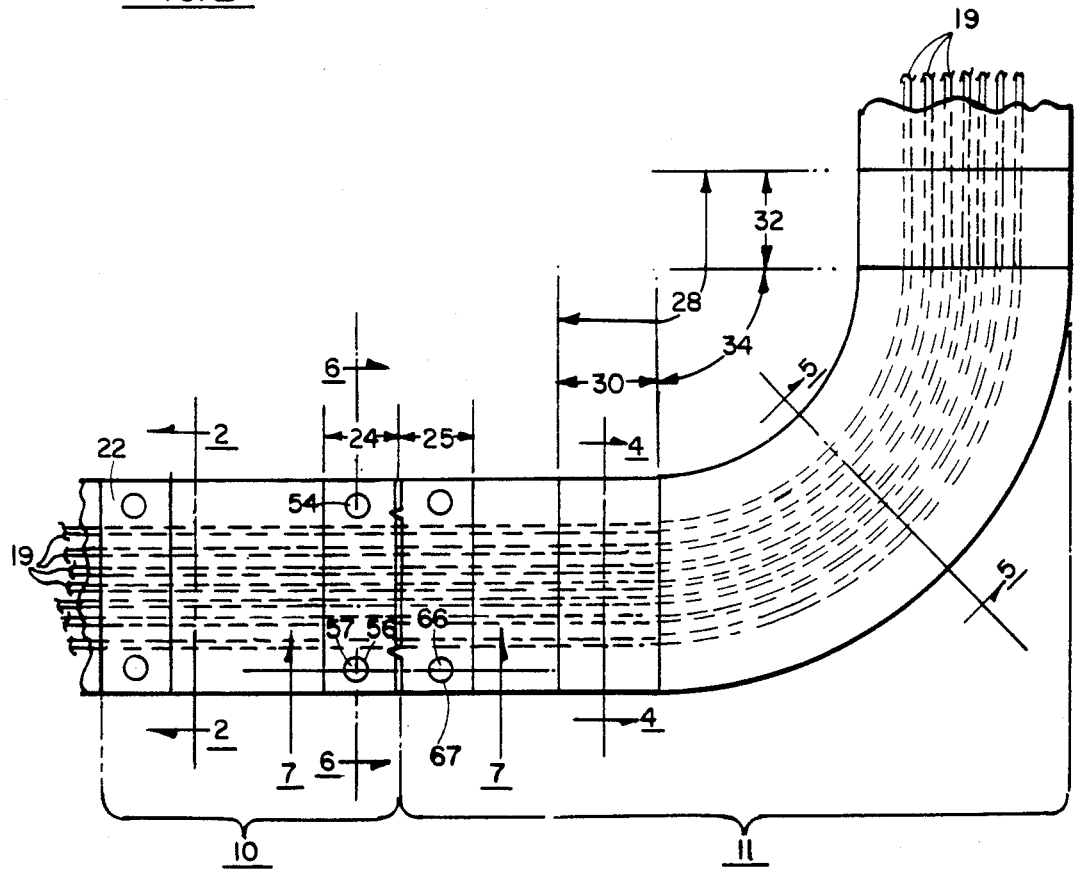
FIG. 3 is a plan elevation view of a first and second invention fiber optic cable coupled by means for terminating said fiber optic cables, the second invention fiber optic cable depicting a contoured segment.

Referring now to FIG. 3, a first straight invention fiber optic flat ribbon cable 10 is depicted as having a first and second ends 22, 24, each end being formed as a flat plane, each respective flat plane being transverse and normal to the fiber optic cable longitudinal axis 26. First and second ends 22, 24 are polished to adapt each said fiber optic filament termination 19 to be optically coupled.

A second fiber optic cable 11 is depicted as having at least one curved segment 28, each respective curved segment having an entry segment 30, an exit segment 32. A contoured segment 34 having a predetermined contour is interposed between said entry segment 30 and said exit segment 32. Cable end 25 is shown coupled to the first fiber optic cable end 24.

Figure 4:
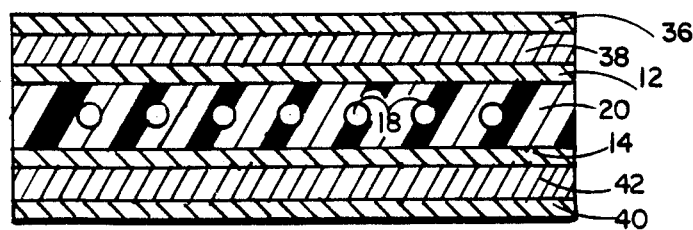
FIG. 4 is a sectional view of an entry segment of the curved segment of the invention fiber optic cable taken on line 4—4 of FIG. 3.

FIG. 4, a sectional view taken on line 4—4 of FIG. 3, shows the first and second layers 12, 14 formed of flexible polyimide sheet, the polyimide sheet being adapted to provide structural support to the immobilized flat fiber optic filaments. In this manner the filaments are protected from tensile and shear stress. In other alternative embodiments, at least one of said first and second layers 12, 14 are formed from sheet polyethylene teraphthalate or sheet KAPTON. In other alternative embodiments, at least one of said first and second layers are formed from sheet MYLAR.

FIG. 4 is a sectional view of an entry segment 30 taken along line 4—4 of FIG. 3. Each respective entry segment 30 and each respective exit segment 32 has a top surface layer 36, an adhesive layer 38 interposed between the top surface layer 36 and the first surface layer 12. The top surface layer 36 is laminated by adhesive layer 38 to the first surface layer 12. The cross section includes includes a bottom surface layer 40, a bottom adhesive layer 42 interposed between the bottom surface layer 40 and the second surface layer 14, the bottom surface layer 40 being laminated to the second surface layer 14 by the bottom adhesive layer 42. The entry segment 30 and the exit segment 32 couple the contoured segment 34 to the fiber optic cable 10.

Figures 5, 6:
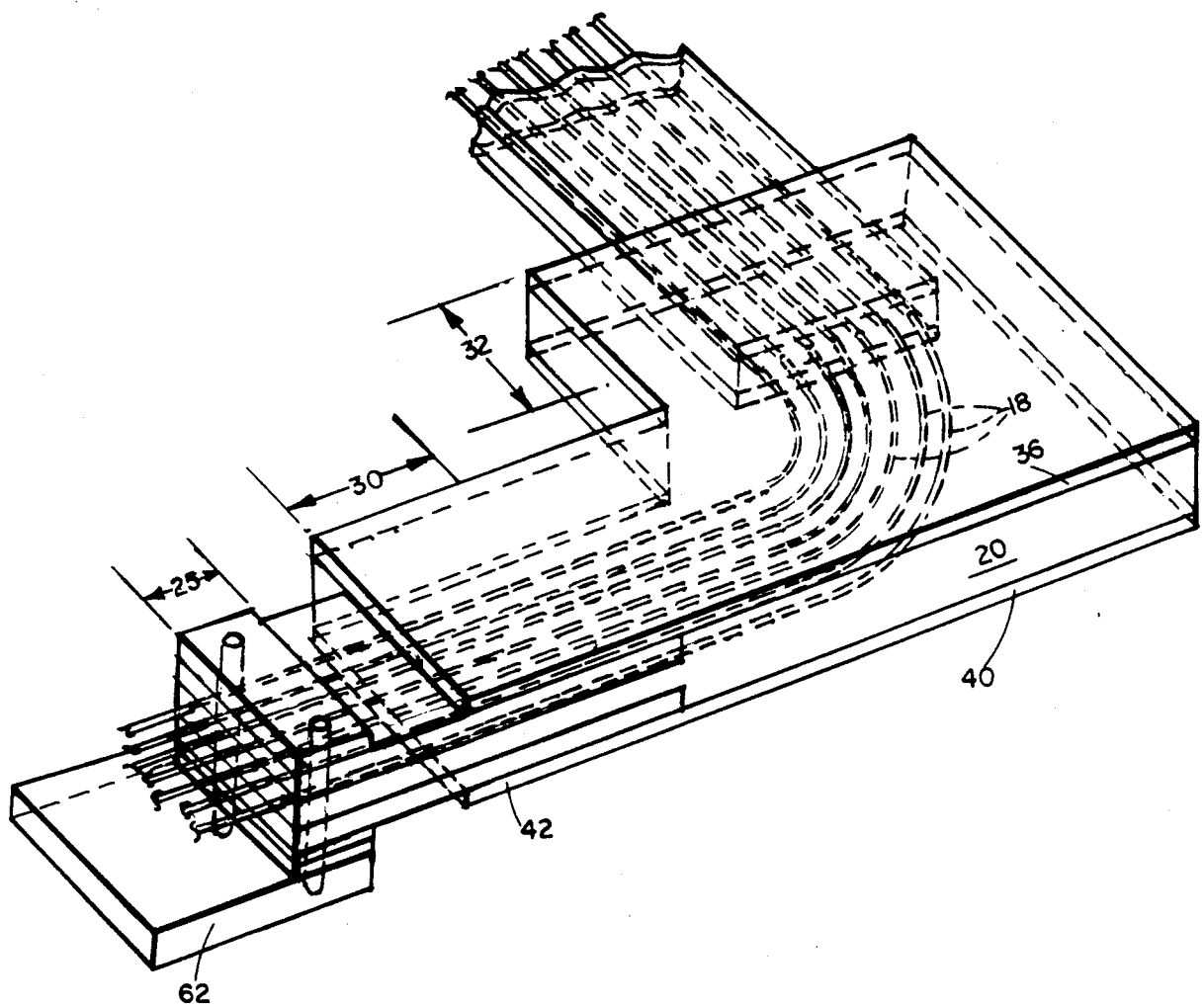
FIG. 5 is a sectional view of the contoured segment of the curved segment of the invention fiber optic cable taken on line 5—5 of FIG. 3.
FIG. 6 is a perspective view of a curved segment of the invention fiber optic cable having an alignment plate attached to one end.

FIG. 5 is a sectional view of the contoured segment 34 along line 5—5 of FIG. 3. The cross section of the contoured segment comprises a top surface layer 36, a bottom surface layer 40, the top and bottom surface layers being stacked in parallel plane relation. A resin layer 20 is included. The top surface layer 36 and the bottom surface layer 40 are contoured and bonded together by the resin layer 20. At least one fiber optic filament 18 is embedded in the resin layer 20 in a predetermined pattern.

FIG. 6 is a perspective view of a curved segment of the invention fiber optic cable showing a cable end 25 bonded to alignment plate 62 and curved segment 28 having entry segment 30, exit segment 32 and a contoured segment 34 interposed between the entry segment 30 and the exit segment 32. Each respective entry segment 30 and each respective exit segment 32 have a top surface layer 36, an adhesive layer 38 interposed between the top surface layer 36 and the first surface layer 12. A bottom surface layer 40 is laminated to the second surface layer 14 by a bottom adhesive layer 42. Top surface layer 36 and bottom surface layer 40 are precoated with resin and bonded to said entry segment 30, said exit segment 32 to form said contoured segment 34, said fiber optic filaments 18 being embedded in said resin layer 20.

Figure 7:
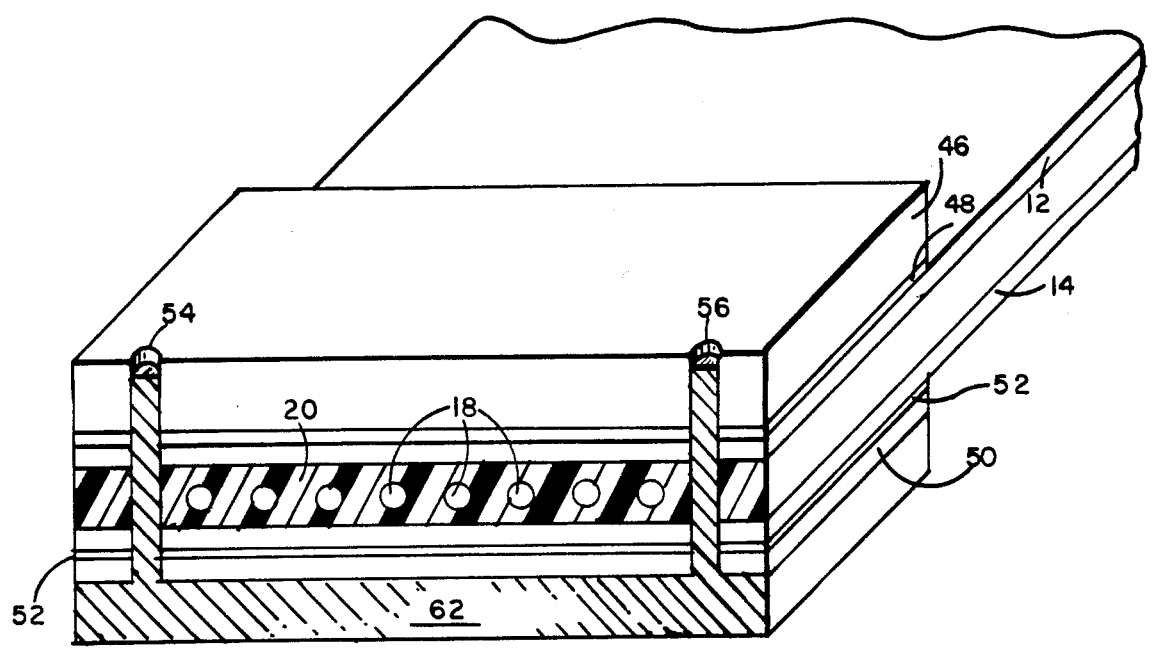
FIG. 7 is a sectional view of a means for terminating the invention fiber optic cable taken along line 6—6 of FIG. 3.

FIG. 7 is a sectional view along line 6—6 of FIG. 3 of a means for terminating each respective fiber optic filament at a first or second cable end 22, 24 and comprising: a short top rigid laminate 46 having a transverse edge, (not shown) a short top rigid laminate adhesive layer 48 interposed between the first surface layer 12 and the short top rigid laminate 46. The short top rigid laminate 46 is bonded to the first surface layer 12 by the short top rigid laminate adhesive layer 48. A short bottom rigid laminate 50 is shown having a transverse edge, (not shown). A short bottom rigid laminate adhesive layer 52 is interposed between the second surface layer 14 and the short bottom rigid laminate 50. The short bottom rigid laminate 50 is bonded to the second surface layer 14 by the short bottom rigid laminate adhesive layer 52. Each respective short top rigid laminate transverse edge and the short bottom rigid laminate transverse edge are formed to be co-planar with the respective flat planes formed by said cable ends 22, 24.

Sectioned alignment holes 54 and 56 provide a means for alignment, the means for alignment being adapted to position each respective fiber optic filament end 18 in coaxial alignment with a corresponding fiber optic filament end.

Figure 8:
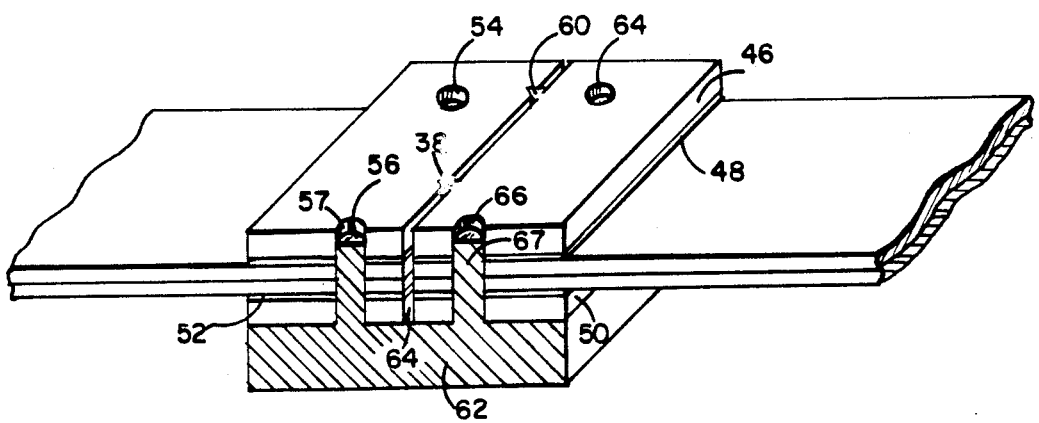
FIG. 8 is a sectional view of a means for terminating the invention fiber optic cable taken along lines 7—7 of FIG. 3.

FIG. 8 is a sectional view of a means for terminating the invention fiber optic cable 10 taken along line 7—7 of FIG. 3 and depicting alignment hole 54, 64 and sectioned alignment holes 56 and 66. Key indentations 58 and 60 are provided to illustrate alternative alignment means. Short rigid laminate layer 50 is shown bonded to a rigid alignment plate 62. Rigid alignment plate 62 is provided with alignment pins 57, 67 which when inserted into corresponding alignment holes 56, 66 position the respective flat planes formed by the cable ends into alignment thereby positioning each respective fiber optic filament in coaxial alignment with a corresponding fiber optic filament end. The gap 64 formed between the respective flat planes formed by the cable ends, is filled with optical grade clear epoxy to complete the light path between corresponding coaxially aligned fiber optic filaments. The short bottom rigid laminate 50 is bonded to the alignment plate 62 subsequent to alignment of the respective flat planes formed by said cable ends and corresponding fiber optic filament ends.

Fiber optic filaments, such as 18 are held in precise alignment prior to lamination by placing the filaments in combs having serrations on predetermined centers designed to achieve a particular pitch or filament separation. The combs are positioned at alternate ends of a cable to be formed. In one embodiment, a resin layer is applied to the first surface layer 12 and the second surface layer 14. The fiber optic filaments are sandwiched by the first surface layer 12 and the second surface layer 14 while being held in tension and separated by the combs. The composite is then bonded in a press under heat and pressure to form the required flat fiber optic cable. By using combs having segments spaced on different centers at alternate ends of the cable during fabrication, a cable is formed having different pitches at each end. Bifurcated cables are formed by using more than two combs.

In an alternative embodiment, a curved segment of a fiber optic cable is formed from a straight fiber optic cable by removing the sheet material comprising the first surface layer 12 and the second surface layer 14 from a segment to be contoured such as contour segment 34. The first and second surface layers 12, 14 can be prepunched to achieve the material removal before the entry segments are laminated. The entry and exit segments 30, 32 of the straight cable are then positioned to achieve the desired contour. Top surface layer 36 and bottom surface layer 40 are then positioned to form a sandwich and are bonded over the exposed contoured segment filaments and the entry and exit segments 30, 32. Excess material is then trimmed to conform the external extremities of the cable to the design required.

A typical separation or pitch for the fiber optic filaments 18 would be on centers spaced at 0.025 inches from each other. One end of the cable would typically be fed into a connector mated to an array of emitters on 0.025 inch centers. Extremely high density is possible using fiber optic filaments of very small diameter, i.e., 0.001 inches and spaced from each other on centers at 0.003 inches. Fiber optic filament material is available from companies such as Corning, Telecommunication Products Department, Corning Glass Works, Corning, N.Y., 14830, or Galite Electro-Optics Corporation, Galileo Park, Sturbridge, Mass., 01518. KAPTON is a trade name for a polyimide sheet material available from E. I. du Pont de Nemours and Company, Wilmington, Del., 19898.

MYLAR is a trade name relating to polyethylene teraphthalate sheet and is available from E. I. du Pont de Nemours and Company, Wilmington, Del. 19898.

The first surface layer 12 and the second surface layer 14 are typically of thicknesses ranging from 0.0005 inches to 0.005 inches in thickness. The short top and bottom rigid laminates 46, 48 are a reinforced laminate material such as polyimide-glass or metal such as aluminum or copper. The adhesive layer 52 may be of an acrylic type such as Dupont's pyralux WA or Fortin's ECC031. The alignment holes may be prepunched prior to bonding.

There is thus provided a fiber optic cable having the advantage of being flat and providing for curved and contoured segments. The description provided is intended to be illustrative only and is not intended to be limitive. Those skilled in the art may conceive of modifications to the embodiments disclosed. However any such modifications which fall within the purview of the description are intended to be included therein as well. The subject of this invention shall be determined from the scope of the following claims including their equivalents.

What is claimed is:

1. A relatively flat fiber optic cable having at least one contour for connecting at least one optical transmitter to at least one optical sensor in an electronic assembly, said relatively flat fiber optic cable comprising:
   at least one flat, straight segment, each flat, straight segment having;
   a first surface layer;

a second surface layer, said first and second surface layers being stacked in parallel plane relation;

a resin layer, said first surface layer and said second surface layer being bonded together by said resin layer;

a plurality of fiber optic filaments, each said fiber optic filament being embedded in said resin layer in a predetermined pattern; each said fiber optic filament being spaced in precise predetermined parallel relation with adjacent fiber optic filaments within said flat straight segment of said fiber optic cable, said flat fiber optic cable also having;

at least one curved segment, each respective curved segment having;
 an entry segment,
 an exit segment, and
 a contoured segment having a predetermined contour and being interposed between said entry segment and said exit segment;

each respective entry segment and each respective exit segment having;
 a top surface layer,
 an adhesive layer interposed between said top surface layer and said first surface layer, said top surface layer being laminated to said first surface layer;
 a bottom surface layer,
 a bottom adhesive layer interposed between said bottom surface layer and said second surface layer, said bottom surface layer being laminated to said second surface layer by said bottom adhesive layer;

means for terminating each respective fiber optic filament to facilitate optically coupling each respective optical transmitter to a respective optical sensor;

whereby, said first surface layer, said second surface layer, said resin layer and said fiber optic filament form a relatively flat, thin, flexible, ribbon fiber optic cable having at least one contour and a cross section relatively free of voids; said fiber optic cable's relative flatness, thinness and flexibility facilitating installation of said fiber optic cable in an electronic assembly and wherein said entry segment and said exit segment couple said contoured segment to said fiber optic cable.

2. The combination of claim 1, wherein each said fiber optic filaments is spaced in precise predetermined parallel relation with adjacent fiber optic filaments within said flat ribbon cable, and wherein said means for terminating each respective fiber optic filament further comprises at least a first and second cable ends, said first and second cable ends each being formed as a flat plane exposing fiber optic filament terminations, each respective flat plane being transverse and normal to said fiber optic cable longitudinal axis, said first and second cable ends being polished to adapt each said fiber optic filament termination for optical coupling.

3. The combination of claim 1, wherein said first and second layers are formed of flexible polyimide sheet, said polyimide sheets being adapted to provide structural support to said immobilized fiber optic filament, whereby said filament is protected from tensile and shear stress.

4. The combination of claim 1, wherein said first and second layers are formed of flexible polyethylene teraphthalate sheet, said polyethylene teraphthalate sheets being adapted to provide structural support to said immobilized fiber optic filament; whereby, each fiber optic filament is protected from tensile and shear stress.

5. The combination of claim 1, wherein said contoured segment further comprises:
 a top surface layer,
 a bottom surface layer, said top and bottom surface layers being stacked in parallel plane relation; a resin layer, said top surface layer and said bottom surface layer being contoured and bonded together by said resin layer;
 at least one fiber optic filament, each said fiber optic filament being embedded in said resin layer in a predetermined pattern.

6. The combination of claim 1, wherein said top surface layer and said bottom surface layer are formed of flexible polyethylene teraphthalate sheet, said polyethylene teraphthalate sheets being adapted to provide structural support to said immobilized fiber optic filament whereby said fiber optic filament is protected from tensile and shear stress.

7. The combination of claim 1, wherein at least one of said top surface layer and said bottom surface layer are formed from sheet KAPTON.

8. The combination of claim 1, wherein at least one of said top surface layer and said bottom surface layer are formed from sheet MYLAR.

9. The combination of claim 4, wherein at least one of said first and second layers are formed from sheet MYLAR.

10. The combination of claim 2, wherein at least one of said first and second layers are formed from sheet KAPTON.

11. The combination of claim 2, wherein said first and second cable ends further comprise:
 a short top rigid laminate having a transverse edge,
 a short top rigid laminate adhesive layer interposed between said first surface layer and said short top rigid laminate, said short top rigid laminate being bonded to said first surface layer;
 a short bottom rigid laminate having a transverse edge,
 a short bottom rigid laminate adhesive layer interposed between said second surface layer and said short bottom rigid laminate, said short bottom rigid laminate being bonded to said second surface layer,
 each respective short top rigid laminate transverse edge and said short bottom rigid laminate transverse edge being co-planar with said respective cable end flat plane, said fiber optic filaments having ends exposed and being co-planar with said cable end flat plane,
 means for alignment, said means for alignment being adapted to position each respective fiber optic filament end in coaxial alignment with a corresponding fiber optic filament end.

12. The combination of claim 11, wherein said means for alignment is adapted to align opposing cable ends and further comprises:
 an alignment plate having a flat surface and at least two alignment pins perpendicular to said flat surface,
 said opposing cable end to be aligned and mated each having at least one alignment hole adapted to receive a corresponding alignment pin,
 each said opposing cable end respective short bottom rigid laminate surface being bonded to a respective alignment plate flat surface with said respective alignment holes receiving corresponding alignment pins and with said alignment plate flat surface holding said opposing cable ends in registration.

* * * * *